United States Patent
Tkacik et al.

(10) Patent No.: US 9,111,122 B2
(45) Date of Patent: Aug. 18, 2015

(54) ASYMMETRIC CRYPTOGRAPHIC DEVICE WITH LOCAL PRIVATE KEY GENERATION AND METHOD THEREFOR

(75) Inventors: Thomas Tkacik, Austin, TX (US); Amir K. Daneshbeh, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 2510 days.

(21) Appl. No.: 11/772,655

(22) Filed: Jul. 2, 2007

(65) Prior Publication Data

US 2010/0027788 A1    Feb. 4, 2010

(51) Int. Cl.
  *G06F 21/77*    (2013.01)
  *H04L 9/30*    (2006.01)
  *H04L 9/14*    (2006.01)
  *H04L 9/08*    (2006.01)
  *H04L 29/06*    (2006.01)
  *G09C 1/00*    (2006.01)
  *H04L 9/06*    (2006.01)

(52) U.S. Cl.
  CPC .............. *G06F 21/77* (2013.01); *H04L 9/0825* (2013.01); *H04L 9/14* (2013.01); *H04L 9/302* (2013.01); *H04L 63/06* (2013.01); *G09C 1/00* (2013.01); *H04L 9/0662* (2013.01); *H04L 63/0442* (2013.01); *H04L 2209/12* (2013.01); *H04L 2209/26* (2013.01)

(58) Field of Classification Search
  None
  See application file for complete search history.

(56) References Cited

U.S. PATENT DOCUMENTS

| | | |
|---|---|---|
| 6,307,938 B1 | 10/2001 | Matyas, Jr. et al. |
| 6,718,536 B2 | 4/2004 | Dupaquis |
| 6,996,547 B1 | 2/2006 | Tugenberg et al. |
| 7,103,782 B1 | 9/2006 | Tugenberg et al. |
| 2003/0204801 A1 | 10/2003 | Tkacik et al. |
| 2005/0027764 A1* | 2/2005 | Agrawal et al. ............... 708/250 |
| 2005/0138386 A1 | 6/2005 | Le Saint |
| 2005/0157872 A1* | 7/2005 | Ono et al. ....................... 380/28 |
| 2005/0166051 A1 | 7/2005 | Buer |
| 2005/0190912 A1 | 9/2005 | Hopkins et al. |
| 2006/0101288 A1* | 5/2006 | Smeets et al. ................. 713/194 |
| 2007/0034700 A1* | 2/2007 | Poidomani et al. ........... 235/492 |

OTHER PUBLICATIONS

Chenghuai Lu, Andre L. M. dos Santos, and Francisco R. Pimentel. 2002. Implementation of fast RSA key generation on smart cards. In Proceedings of the 2002 ACM symposium on Applied computing (SAC '02). ACM, New York, NY, USA, 214-220. DOI=10.1145/508791.508837 http://doi.acm.org/10.1145/508791.508837.*

(Continued)

*Primary Examiner* — Alexander Lagor
(74) *Attorney, Agent, or Firm* — Charlene R. Jacobsen

(57) ABSTRACT

An asymmetric cryptographic integrated circuit 20 and a data processing device 10 in which the integrated circuit 20 is used are disclosed. A security boundary 44 is confined to the interior of integrated circuit 20. A random number generator 50 with a hardware entropy source 54 and an arithmetic unit 62 programmed through microcode 38" to perform a variety of cryptographically useful functions are included within security boundary 44. One of these functions is a primality tester 72. A controller 36 for integrated circuit 20 may cause cryptographically sensitive data, such as large random prime numbers and a clear private key to be generated within the confines of security boundary 44. A symmetric key encryption engine 56 is included within security boundary 44 and used to encrypt the clear private key so that a resulting encrypted private key may be stored outside security boundary 44 in a non-volatile memory 12.

1 Claim, 5 Drawing Sheets

(56) References Cited

OTHER PUBLICATIONS

Elena Trichina, Marco Bucci, Domenico De Seta, and Raimondo Luzzi. 2001. Supplemental Cryptographic Hardware for Smart Cards. IEEE Micro 21, 6 (Nov. 2001), 26-35. DOI=10.1109/40.977755 http://dx.doi.org/10.1109/40.977755.*

Ashkenazi, Asaf, Security Features in the i.MX31 and i.MX31L Multimedia Applications Processors, Freescale Semiconductor, Inc., 2005.

Menezes, et al., Handbook of Applied Cryptography, Chapter 2, pp. 48-86, CRC Press, 1996.

Menezes, et al., Handbook of Applied Cryptography, Chapter 4, pp. 133-168, CRC Press, 1996.

Menezes, et al., Handbook of Applied Cryptography, Chapter 8, pp. 283-319, CRC Press, 1996.

VIA Technologies, Inc., Evaluation Summary: VIA C3 Nehemiah Random Number Generator, Cryptography Research, Inc., 2003.

Rivest, et al., A Method for Obtaining Digital Signatures and Public-Key Cryptosystems, pp. 120-126, Communications of the ACM, vol. 21, No. 2, Feb. 1978.

* cited by examiner

ASYMMETRIC CRYPTOGRAPHIC DEVICE WITH LOCAL PRIVATE KEY GENERATION AND METHOD THEREFOR

TECHNICAL FIELD OF THE INVENTION

This invention relates in general to the field of secure data processing systems. Specifically, the present invention relates to a data processing device which generates its own private key for use in asymmetric cryptographic operations.

BACKGROUND OF THE INVENTION

Data processing systems have a need to engage in secure operations from time to time. In general, such operations are concerned with authenticating users and/or data, authorizing users and/or data, and securely communicating data. In recent decades, asymmetric cryptography, also known as public-key cryptography, has become popular. While asymmetric cryptography is more computationally intensive than another form of cryptography, called symmetric cryptography or secret-key cryptography, it provides benefits when used in an environment where new users or data repeatedly need to be authenticated, authorized, and/or communicated.

Asymmetric cryptography uses a private key which is kept secret, or within the confines of a security boundary, and a public key which may be freely distributed within the untrustworthy environment. The public key and private key are mathematically related. But with sufficiently strong keys—and keys having a length of many hundred to a few thousand bits are common—potential attackers will find it impractical to derive, or even to attempt to derive, a private key from a public key. Accordingly, with sufficiently strong keys the weakest links in the security of an asymmetric cryptographic system are often key generation, key distribution, validation and certification, and key storage rather than mathematical attacks upon the public key.

Unfortunately, the costs associated with key generation, key distribution, validation and certification, and key storage have been undesirably high. The trust one has in the security system can be no better than the trust one has in the systems that generate a private key, distribute the private key, and store the private key. To guarantee that trust, extreme and expensive measures are often taken. The expenses associated with such measures have been so large that many conventional data processing systems have altogether avoided implementing cryptographically valid techniques, and suffered excessive security risks as a result.

For example, very powerful and very secure computers are often used to generate private keys. Such computers, when viewed along with the security provisions that surround them, can be very expensive. Moreover, when such computers are used to centrally generate many different private keys for many different data processing systems, a security vulnerability develops where the central key-generation facility becomes a highly valued target for attack due to the large number of data processing systems that can be compromised by a single breach in security.

When private keys are generated at a central facility, they are then distributed through the untrustworthy environment to the data processing systems where they will be used. The distribution of private keys is another security vulnerability that is conventionally addressed by complex and expensive techniques that merely ameliorate the problem but do not solve it.

Then, once distributed, private keys are conventionally injected across security boundaries associated with data processing systems and saved for use within the trusted confines of the security boundaries. Security vulnerabilities are often present in the injection process, and maintaining a security boundary for as long as a data processing system stores the private key can be a costly and troublesome process that is often performed poorly.

For example, when a security boundary surrounds an entire data processing system, such as a computer, then that system should be isolated from the untrustworthy environment. In other words, it should be kept in a secure place, the security of that place should be maintained for an extended period of time, user access to that computer should be limited to only trusted users, provisions should be devised and enforced to assure the trustworthiness of the users, and the computer should be protected from corruption by data from the untrustworthy environment. Such data may include untrustworthy computer programs, viruses, worms, trojans, and the like which, if executed on the trusted computer could compromise security for the entire data processing system. These are restrictions that are simply impractical and too costly for many applications to which data processing systems are put.

Some data processing systems have established security boundaries entirely within the interior confines of a computer. In other words, the interfaces between the data processing system and users or other computers are viewed as being part of the untrustworthy environment. In such applications, providers of such systems often suggest that the data processing system may be placed at any location in the untrustworthy environment, that no unusual location restrictions need be imposed to maintain security, and restrictions concerning protection from data corruption can be relaxed. Such systems are more usable in the wide variety of different applications to which data processing systems are put and can be less expensive. But they are too often subject to significant security vulnerabilities. For example, in such systems the security boundaries are too easily breached, even while the system is operating because signals traveling between components are exposed to the untrustworthy environment. In some examples, critical security features, such as a private key, may be detected merely through debugging operations and probing.

In another example, private keys are generated locally in a data processing system in response to user-supplied "seeds". The expense and vulnerabilities of a centralized key generation facility and key distribution are avoided. But new vulnerabilities are introduced as an untrustworthy environment is used for the generation of a private key. The use of user-supplied seeds in the generation of a private key is particularly troublesome because users cannot be relied upon to provide truly random seeds, and the generation of such seeds can be an unworkably slow process when repeated numerous times in a programming loop. As a consequence, the resulting private key generated in reliance on such seeds is too often not as strong as it might be, and it may be vulnerable to mathematical manipulations performed on the public key. And, adequate trust cannot be guaranteed for the software used to generate the private key or for the private key storage facilities.

Accordingly, a need exists for an asymmetric cryptographic device that generates a private key locally within the device, which imposes a strong security boundary within the confines of the device, which avoids the security vulnerabilities of conventional techniques, and/or which does so at less expense than conventional techniques. By reducing the expenses associated with cryptographically valid processes, a wider variety of data processing systems and devices may benefit from asymmetric cryptographic techniques.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Figure 1:
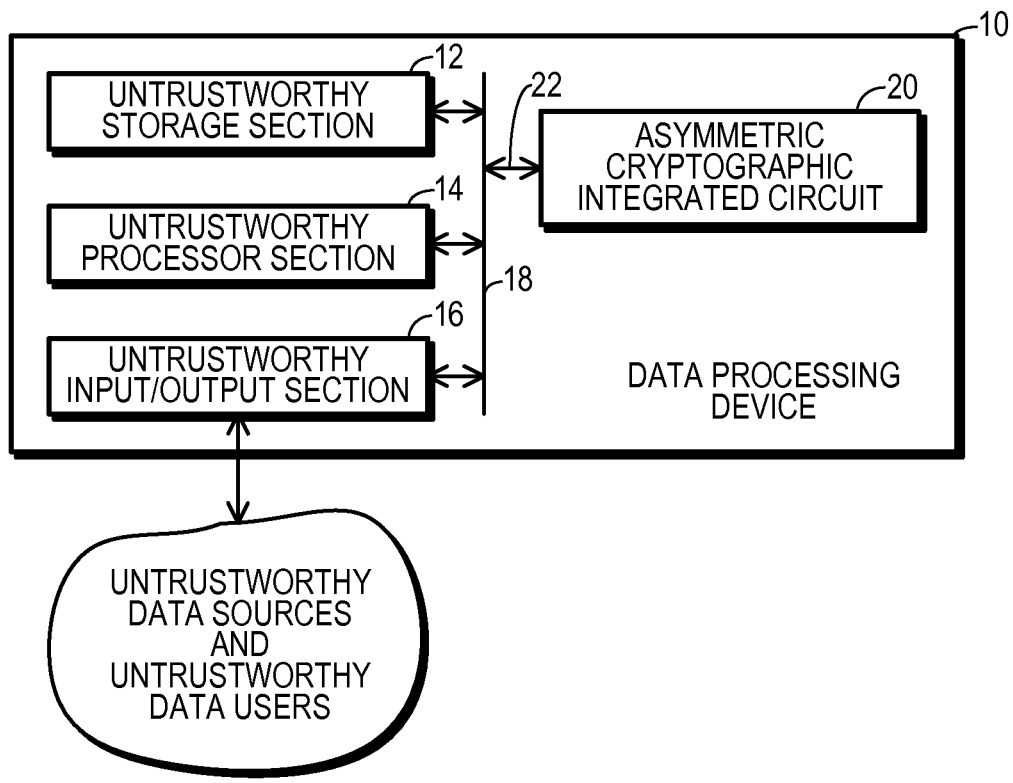
FIG. 1 shows a block diagram of a data processing device configured in accordance with the teaching of one embodiment of the present invention.

FIG. 1 shows a block diagram of a data processing device 10 configured in accordance with the teaching of one embodiment of the present invention. Data processing device 10 may function as any of a wide variety of computing devices, including but not limited to a personal computer, desktop computer, workstation, server, laptop computer, handheld computer, music and/or video player, cell phone, telephone, facsimile machine, or DRM player.

Data processing device 10 includes a storage section 12, a processor section 14, and an input/output section 16 which couple to one another through one or more data busses 18. Each of sections 12, 14, and 16 and data busses 18 may be configured and operate in a conventional manner. Thus, storage section 12 may include any amount of both volatile and non-volatile memory configured for read and write operations. Computer software instructions for execution by processor section 14 and data for processing by processor section 14 may be stored in storage section 12. Processor section 14 executes any number of different computer software programs and processes data in accordance with the dictates of the programs. Input/output section 16 is used in moving data into and out of data processing device 10, and may include such items as a keyboard, pointing device, microphone, camera, card reader, barcode reader, printer, display, speaker, and the like. In addition, input/output section 16 is used in communicating data with other data processing devices 10, whether or not configured as this data processing device 10. Thus, input/output section 16 may also or alternatively include such items as a wireless interface, a network interface, universal serial bus (USB) port, Firewire port, public switched telecommunication network (PSTN) interface, or the like.

FIG. 1 indicates that each of sections 12, 14, and 16 are deemed to be "untrustworthy", as is any channel, source, or destination for data which may enter or exit data processing device 10. Those skilled in the art will appreciate that the term "untrustworthy" is used in a cryptographic sense. Untrustworthy items or data should not be "trusted" or relied upon from a security perspective. Whatever level of security is achieved for data processing device 10, that level is achieved without reliance on the untrustworthy items. Those skilled in the art will appreciate that untrustworthy components, devices, and data can be, and desirably are, relied upon for many functions unrelated to security. And, it is desirable that as much data, and as many components or items associated with data processing system 10 as possible be deemed untrustworthy. The less data, and fewer components or other items that need to be treated as being trusted, the less expensive and the more user friendly and useful data processing system 10 is likely to be.

In the preferred embodiment of data processing device 10 depicted in FIG. 1, the only item that is associated with cryptographic trust is an asymmetric cryptographic integrated circuit (IC) 20. Asymmetric cryptographic IC 20 has a data port 22 that couples to one or more of sections 12, 14 and 16 through data busses 18 and is discussed in more detail below.

Those skilled in the art will appreciate that nothing requires only asymmetric cryptographic IC 20 to be associated with cryptographic trust, but expenses may increase and ease-of-use decrease if the region of cryptographic trust is larger than it needs to be. Expenses decrease and ease-of-use increases as fewer security precautions are imposed on data processing device 10 and its users. For example, the entirety of data processing device 10 may be located in a trusted room, accessed only by trusted users, and prevented from accessing all untrustworthy data sources through the Internet, wireless transmissions, portable storage devices, or the like. In this example, sections 12, 14, and 16 may then be deemed as being trusted rather than untrustworthy. But such uses for data processing device 10 will be unnecessary for most applications, and will increase expenses while limiting the usefulness of data processing device 10.

Moreover, some of the sources and users that may provide data to data processing device 10 may actually be trustworthy. But those skilled in the art will appreciate that one of the uses for cryptographic functions in data processing device 10 is to verify the trustworthiness of such data sources and users, and that until and unless trust has been verified, standard security precautions suggest that such data sources and users should be treated as being untrustworthy.

Figure 2:
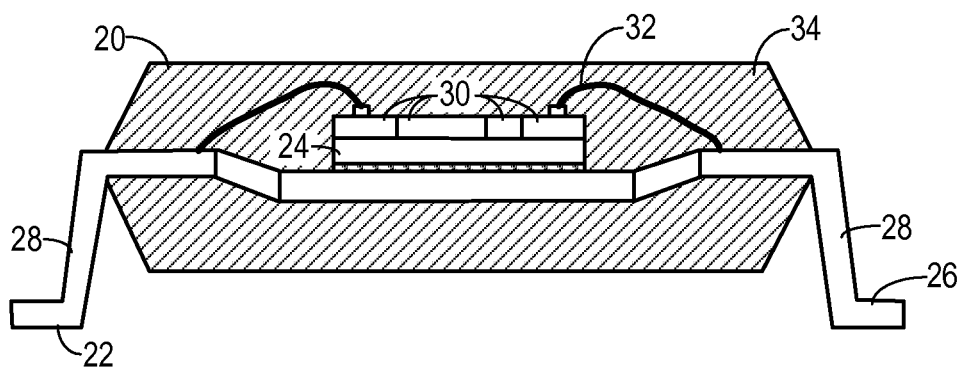
FIG. 2 shows a cross-sectional, side-view representation of an asymmetric cryptographic integrated circuit used in accordance with the teaching of one embodiment of the present invention.

FIG. 2 shows a cross-sectional, side-view representation of asymmetric cryptographic IC 20 used in accordance with the teaching of one embodiment of the present invention. Asymmetric cryptographic IC 20 is desirably produced in accordance with conventional, low cost integrated circuit processing techniques. Such techniques are well established and promote the low cost nature of asymmetric cryptographic IC 20, which likewise promotes a low cost characteristic for data processing device 10 (FIG. 1).

Asymmetric cryptographic IC 20 includes a substrate 24 attached to a leadframe 26. Leadframe 26 includes any number of pins 28, one or more of which serve as data port 22 for moving data into and out from asymmetric cryptographic IC 20.

Substrate 24 may be provided by any type of substrate on which electronic circuits 30 are formed in accordance with semiconductor integrated circuit processing techniques known to those skilled in the art. Hence, substrate 24 is a semiconductor, integrated circuit substrate. Electronic circuits 30 need not be formed directly in contact with substrate 24 but may also be formed on or above other layers that more directly reside on substrate 24.

Some of electronic circuits 30 electrically couple to pins 28 through wire bonds 32 or using any other technique known to those skilled in the art. Substrate 24, including all electronic circuits 30 directly or indirectly formed thereon, is embedded within an integrated circuit package 34 in a manner known to those skilled in the art, and preferably in accordance with one of the lower cost techniques which encapsulates substrate 24 in a polymeric material, such as an epoxy or plastic. Pins 28 protrude outside package 34 and are measurable from outside package 34 using conductive electronic probes, by coupling pins 28 to other electronic components, or in any other way known to those of skill in the art. Due to the embedding of electronic circuits 30 within package 34, circuits 30 and the signals processed therein are hidden from measurement by instrumentalities located outside asymmetric cryptographic IC 20. And, electronic package 34 desirably cures to a rigid solid material that cannot be removed or breached for purposes of probing electronic circuits 30 without destroying asymmetric cryptographic IC 20.

Those skilled in the art will appreciate that nothing requires asymmetric cryptographic IC 20 to be formed in the shape depicted in FIG. 2 or using the type of pin structure depicted in FIG. 2. Any of the wide variety of packages and pin structures known in the art may be adopted in manufacturing asymmetric cryptographic IC 20. Likewise, nothing requires substrate 24 to be formed in a single monolithic section. Rather multiple sections may be provided for substrate 24 with all such sections embedded within package 34.

Figure 3:
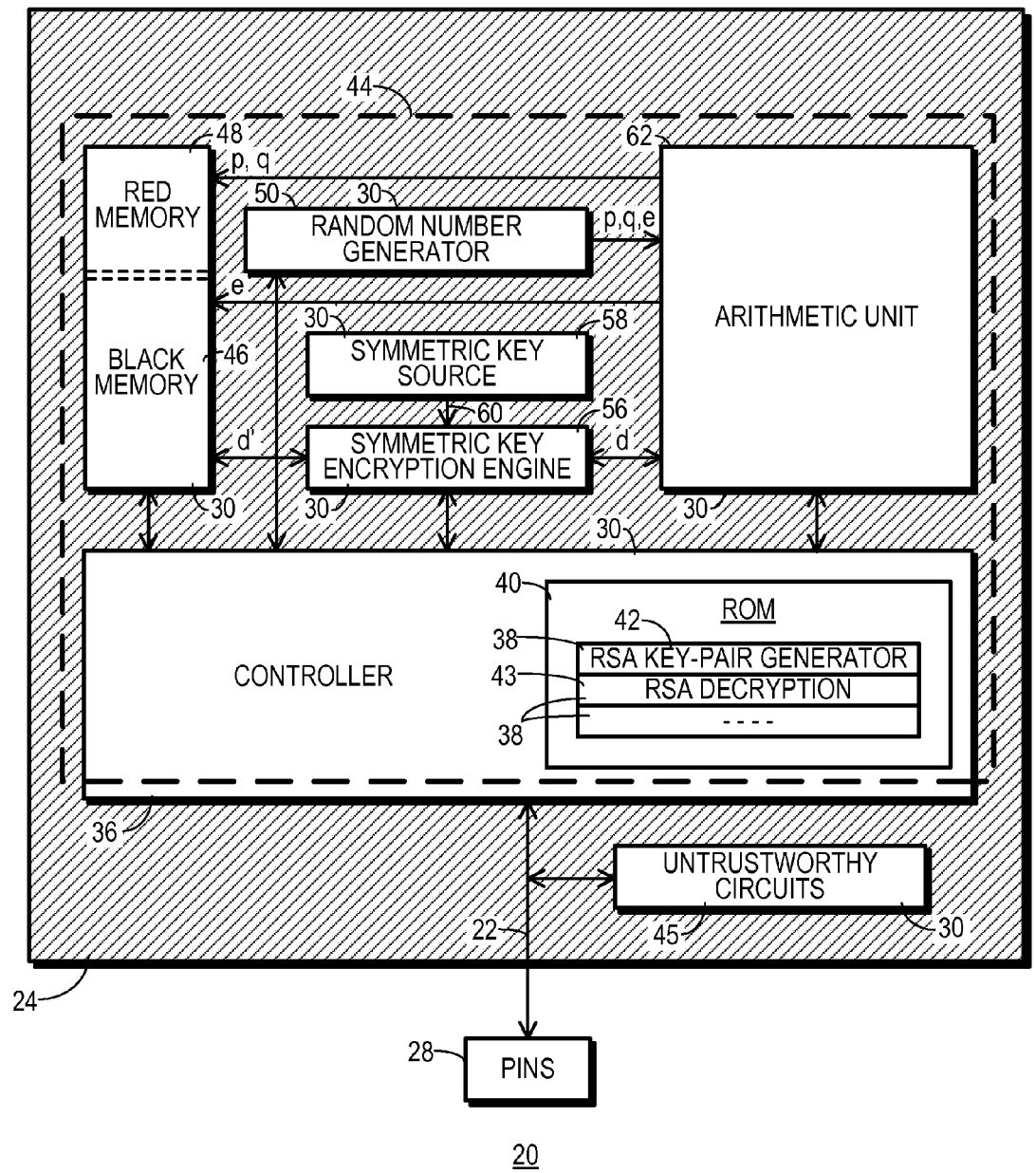
FIG. 3 shows a block diagram of the asymmetric cryptographic integrated circuit depicted in FIG. 2.

FIG. 3 shows a block diagram of asymmetric cryptographic integrated circuit 20 showing electronic circuits 30 formed thereon. Those skilled in the art will appreciate that the relative sizes and layout of circuits 30 need not match the depiction of FIG. 3.

A controller 36 represents one of electronic circuits 30 formed on substrate 24 and embedded within integrated circuit package 34 (FIG. 2). Controller 36 is implemented using a microprocessor, microcontroller, state machine, or similar structure to carry out a series of software instructions defined by microcode 38. Controller 36 includes a read-only memory (ROM) section 40 which is also formed on substrate 24 and embedded in package 34, and in which microcode 38 is stored.

Microcode 38 is configured to provide any number of separate processes, one of which may be an RSA key-pair generator 42 discussed below in more detail in connection with FIG. 6. Another process may be an RSA decryption process 43, discussed below in more detail in connection with FIG. 7. Since microcode 38 is stored in ROM, it cannot be altered after asymmetric cryptographic IC 20 has been manufactured. Moreover, microcode 38 is accessible only from within asymmetric cryptographic IC 20, and specifically by controller 36. It cannot be accessed by untrustworthy sections 12, 14, or 16 (FIG. 1) of data processing device 10. Due to the static nature of microcode 38, the trust associated with microcode 38 at the time of manufacturing is unalterable and remains with asymmetric cryptographic IC 20 throughout its useful life, even though asymmetric cryptographic IC 20 may be used in an untrustworthy environment. While microcode 38 is confined within asymmetric cryptographic IC 20, nothing requires microcode 38 to be kept secret. Microcode 38 may be freely published because the cryptographic trust provided by asymmetric cryptographic IC 20 does not rely upon maintaining the secrecy of microcode 38.

Controller 36 as configured by microcode 38 manages the overall operation of asymmetric cryptographic IC 20 and acts as a gateway for a security boundary 44 that is entirely embedded within asymmetric cryptographic IC 20. As a gateway for security boundary 44, controller 36 couples to data port 22 and the one or more of pins 28 that serve data port 22. It is through controller 36 acting as a gateway for security boundary 44 that data from outside asymmetric cryptographic IC 20 is received into asymmetric cryptographic IC 20 and data generated inside asymmetric cryptographic IC 20 is sent outside asymmetric cryptographic IC 20. FIG. 3 depicts controller 36 as being the only gateway for security boundary 44.

FIG. 3 shows that untrustworthy circuits 45 may also be formed on substrate 24. Untrustworthy circuits 45 are located outside security boundary 44 and may couple to data port 22. There is no restriction on what functions may be implemented in untrustworthy circuits 45. For example, at least a portion of the functions provided by sections 12, 14, and/or 16 (FIG. 1) may be implemented by circuits 45.

Those skilled in the art will appreciate that a wide variety of techniques may be devised for moving data into and out of security boundary 44 in asymmetric cryptographic IC 20 using a diverse variety of interface devices that may be only indirectly controlled by microcode 38. Such interface devices are considered to be a part of controller 36 for the purposes of this discussion because they and/or the data that pass through them are controlled by controller 36.

The provision of security boundary 44 entirely embedded within a single integrated circuit (e.g., asymmetric cryptographic IC 20) provides a benefit. Due to this small, entirely embedded security boundary, trust need not be maintained in any physical space outside asymmetric cryptographic IC 20. In other words, no special security precautions need be adopted to address risks associated with detecting or measuring any signal which is susceptible to measurement on any conductor within data processing device 10. If a security boundary 44 were configured to encompass more than one IC, which it does not in the embodiment depicted in FIG. 3, then standard security precautions would suggest that the physical space between such ICs would need to be secured against such detection and measurement. The costs of such precautions and risks of such precautions being defeated are avoided in data processing device 10.

Asymmetric cryptographic IC 20 includes several other electronic circuits 30 formed on substrate 24, embedded within IC package 34, and located within security boundary 44. One such circuit 30 is a memory labeled in FIG. 3 as having a black section 46 and a red section 48. Black and red memories 46 and 48 couple to controller 36. Red memory 48 is provided for the temporary storage of cryptographically sensitive data that need to be protected from disclosure outside security boundary 44. Black memory 46 is provided for the storage of less cryptographically sensitive data that may or will be disclosed outside boundary 44.

FIG. 3 depicts both black and red memories 46 and 48 as being located within security boundary 44. Hence, the distinction between black and red memories is unnecessary for this embodiment, and one memory may suffice for both functions. But other embodiments can arrange memories 46 and 48 differently so that black memory 46, or an interface portion of black memory 46, resides outside security boundary 44 while red memory 48 remains inside. In such an embodiment, it is desirable to maintain the distinction and separation between black and red memories 46 and 48.

In the preferred embodiment, memories 46 and 48 provide volatile storage. In other words, when power is removed from asymmetric cryptographic IC 20, data stored in memories 46 and 48 will be lost. The volatile nature of memories 46 and 48 provides benefits. One benefit may be that the formation of volatile memory using conventional semiconductor processing techniques on substrate 24 is a relatively cheap, simple, and reliable process that is compatible with the processing of the other ones of electronic circuits 30. On the other hand, the formation of non-volatile memory with other electronic circuits 30 is a more complex, incompatible, and costly process. Thus, configuring memories 46 and 48 to be volatile storage promotes the low-cost nature of asymmetric cryptographic IC 20 and of data processing device 10.

Another benefit may be that security is enhanced. At any time power is removed from asymmetric cryptographic IC 20, the contents of red memory 48 are lost, regardless of whether asymmetric cryptographic IC 20 is performing cryptographic functions. Any cryptographically sensitive data is destroyed. Security is enhanced because it is more difficult to use mechanical and electrical probing techniques to discover data from a volatile memory which loses its contents when power is removed than from a non-volatile memory which retains data after power has been removed.

Asymmetric cryptographic IC 20 also includes a random number generator 50 formed on substrate 24, embedded within IC package 34, and located within security boundary 44. Random number generator 50 couples to controller 36.

Figure 4:
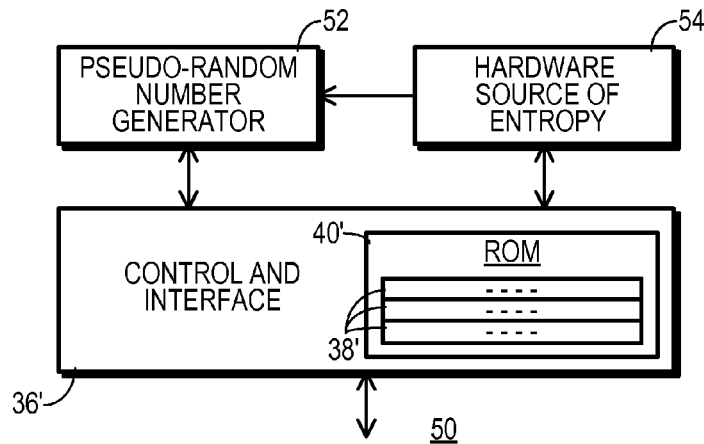
FIG. 4 shows a block diagram of a random number generator included in the asymmetric cryptographic integrated circuit depicted in FIGS. 2 and 3.

FIG. 4 shows a block diagram depicting more details of one embodiment of random number generator 50. Random number generator 50 includes a control and interface section 36', which includes a ROM section 40' in which microcode 38' is stored. Control and interface section 36' and ROM section 40' may be provided by control section 36 and ROM section 40 discussed above in connection with FIG. 3, or control and interface section 36' and ROM section 40' may be separate sections dedicated strictly to random number generator 50.

A pseudo-random number generator 52 couples to control and interface section 36', and a hardware source of entropy 54 couples to control and interface section 36' and to pseudo-random number generator 52.

Those skilled in the art will appreciate that pseudo-random number generator 52 may be a deterministic device. Thus, on its own it need not generate truly random numbers. But when properly seeded by a sufficiently random number seed, pseudo-random number generator 52 can generate cryptographically adequate random numbers. Under the control of microcode stored in ROM 40', hardware entropy source 54 generates and provides a random number seed for pseudo-random number generator 52, whereupon, pseudo-random number generator 52 is directed to generate one or more random numbers. In the preferred embodiments, random numbers having from a few hundred to a few thousand bits may be rapidly generated in this manner by random number generator 50.

Hardware entropy source 54 may be implemented using a collection of slower and faster, jittery, freewheeling oscillators or in any other manner understood by those of skill in the art. Accordingly reliably random seeds may be quickly and repeatedly generated as needed by a variety of cryptographic functions. No user-supplied data, keystrokes, mouse activity, process timings, or other data generated outside of security boundary 44 are relied upon in generating the seeds. Consequently, the security level achieved through the use of asymmetric cryptographic IC 20 is not reduced by the use of poor seeds obtained from the untrustworthy environment. In short, random numbers generated by random number generator 50 are completely unresponsive to all data generated outside of security boundary 44 and asymmetric cryptographic IC 20. Consequently, control of the level of security provided by asymmetric cryptographic IC 20 is maintained rather than released to the dictates of the untrustworthy environment.

Referring back to FIG. 3, other circuits 30 formed on substrate 24 and embedded within package 34 include a symmetric key encryption engine 56 and a symmetric key source 58. Symmetric key source 58 couples to symmetric key encryption engine 56, and symmetric key encryption engine 56 couples to black memory 46 and to controller 36. In the preferred embodiment, symmetric key encryption engine 56 performs a conventional symmetric encryption/decryption process, such as the advanced encryption standard (AES), using a symmetric key (e.g., a random number having a cryptographically significant number of bits) provided by symmetric key source 58. Symmetric key source 58 need not provide more than one symmetric key. Encrypted data produced by this process are stored in black memory 46. Or, encrypted data may be obtained from black memory 46 and decrypted in encryption engine 56.

Symmetric key source 58 is desirably configured as a non-volatile source of a symmetric key 60. Desirably, symmetric key 60 is as truly random as practical, at least a few hundred bits in length, and most likely unique to the particular asymmetric cryptographic IC 20 in which it is stored. Symmetric key 60 never leaves the confines of security boundary 44, is unalterable, and is undetectable from outside asymmetric cryptographic IC 20.

In one embodiment, laser-scribed fuses formed using semiconductor processing techniques in the upper regions above substrate 24 are burned during manufacture to permanently program symmetric key 60. In another embodiment, electronic fuses located in the lower regions above substrate 24 are electronically burned and blocked against further programming during a test phase after manufacturing to program symmetric key 60. In still another embodiment, during the test phase, or later, random number generator 50 is used to generate symmetric key 60, which is then electronically burned into fuses and blocked from subsequent programming. Not even the manufacturer needs to know symmetric key 60 for any asymmetric cryptographic IC 20. Thus, the manufacturer need not bear expenses associated with properly disposing of or maintaining security for a list of symmetric keys 60 programmed into a population of asymmetric cryptographic ICs 20, and the security risks of improperly disposing or improperly maintaining such lists are avoided altogether.

An arithmetic unit 62 is another circuit 30 formed on substrate 24, embedded within package 34, and located within security boundary 44. Arithmetic unit 62 couples to red memory 48, to black memory 46, to random number generator 30, to encryption engine 56, and to controller 36. Arithmetic unit 62 provides modular and integer arithmetic operations that are useful for a variety of asymmetric cryptographic functions.

Figure 5:
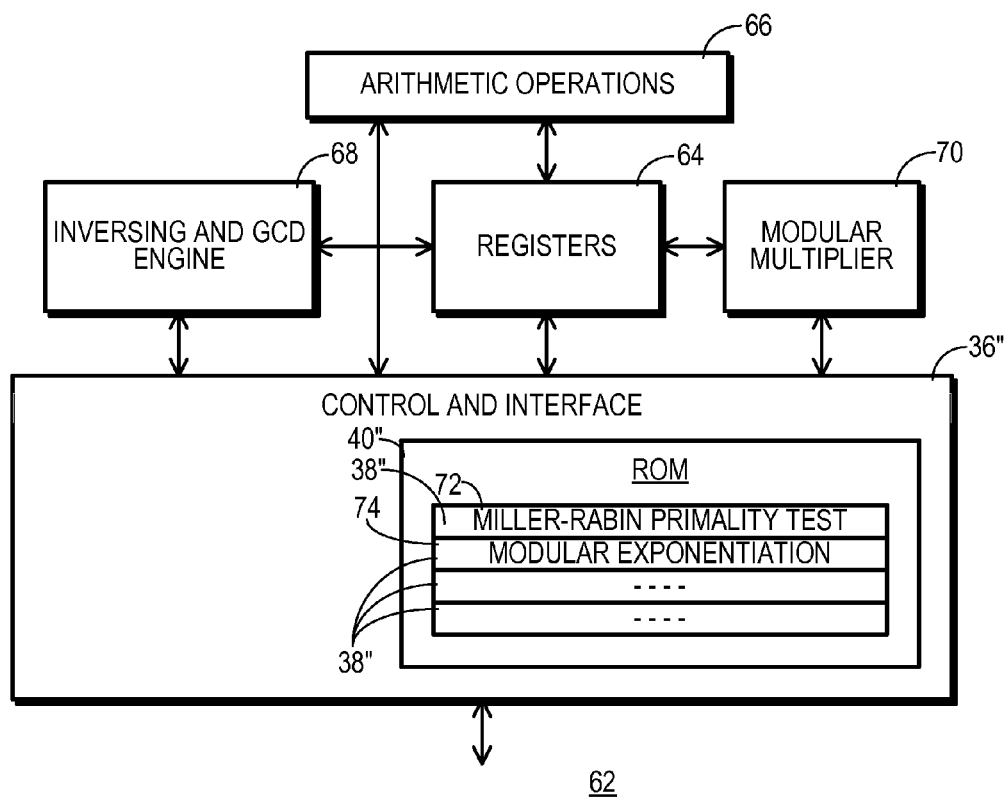
FIG. 5 shows a block diagram of an arithmetic unit included in the asymmetric cryptographic integrated circuit depicted in FIGS. 2 and 3.

FIG. 5 shows a block diagram of arithmetic unit 62. Arithmetic unit 62 operates under the management of microcode 38" associated with a control and interface section 36". In particular, control and interface section 36" includes a ROM section 40" in which microcode 38" is stored. Control and interface section 36" and ROM section 40" may be provided by control section 36 and ROM section 40 discussed above in connection with FIG. 3, or control and interface section 36" and ROM section 40" may be separate sections dedicated strictly to arithmetic unit 62.

In addition to control and interface section 36", arithmetic unit 62 includes a block of registers 64 in which data are stored while being mathematically manipulated. Registers couple to control and interface section 36" An arithmetic operations section 66 couples to registers 64 and to control and interface section 36". Arithmetic operations section 66 performs conventional integer arithmetic operations, such as add, subtract, increment, decrement, and multiply, on numbers which may be several hundred to a few thousand bits in length. The operands for such arithmetic operations and the results from such operations are stored in registers 64.

And, arithmetic unit 62 includes an inversing and greatest common divisor (GCD) section 68 and a modular multiplier section 70. Sections 68 and 70 perform modular arithmetic operations which are commonplace in carrying out asymmetric cryptographic functions. Section 68 may be implemented to carry out a Euclidean algorithm for computing the greatest common divisor of two integers. Section 70 may be implemented to carry out Montgomery multiplication in a manner known to those skilled in the art.

Microcode 38" includes any number of different software programs which cause arithmetic unit 62 to perform different operations. One such program implements a probabilistic primality test 72, such as the well known Miller-Rabin primality test, but other primality testing algorithms may be used as well. When primality test program 72 of microcode 38" is being executed by arithmetic unit 62, arithmetic unit 62 becomes a primality tester. In general, the Miller-Rabin primality test operates on two input values. One is a number to be tested to determine whether it is a prime number. The other is a number that specifies how many iterations should be used to make its determination, with greater amounts of time being required to achieve increasingly more certain primality determinations. An output from the primality test is an indication of whether the input number was determined to be a prime number.

Another example of a microcode 38" program is a modular exponentiation program 74. Modular exponentiation program 74 uses repetitive calls to modular multiplier 70 to perform a modular exponentiation operation. Modular exponentiation is a basic operation often used in performing a variety of asymmetric cryptographic functions, and may be called by other programs, such as primality test 72 as well. When modular exponentiation program 74 of microcode 38" is being executed by arithmetic unit 62, arithmetic unit 62 becomes a modular exponentiator.

Figure 6:
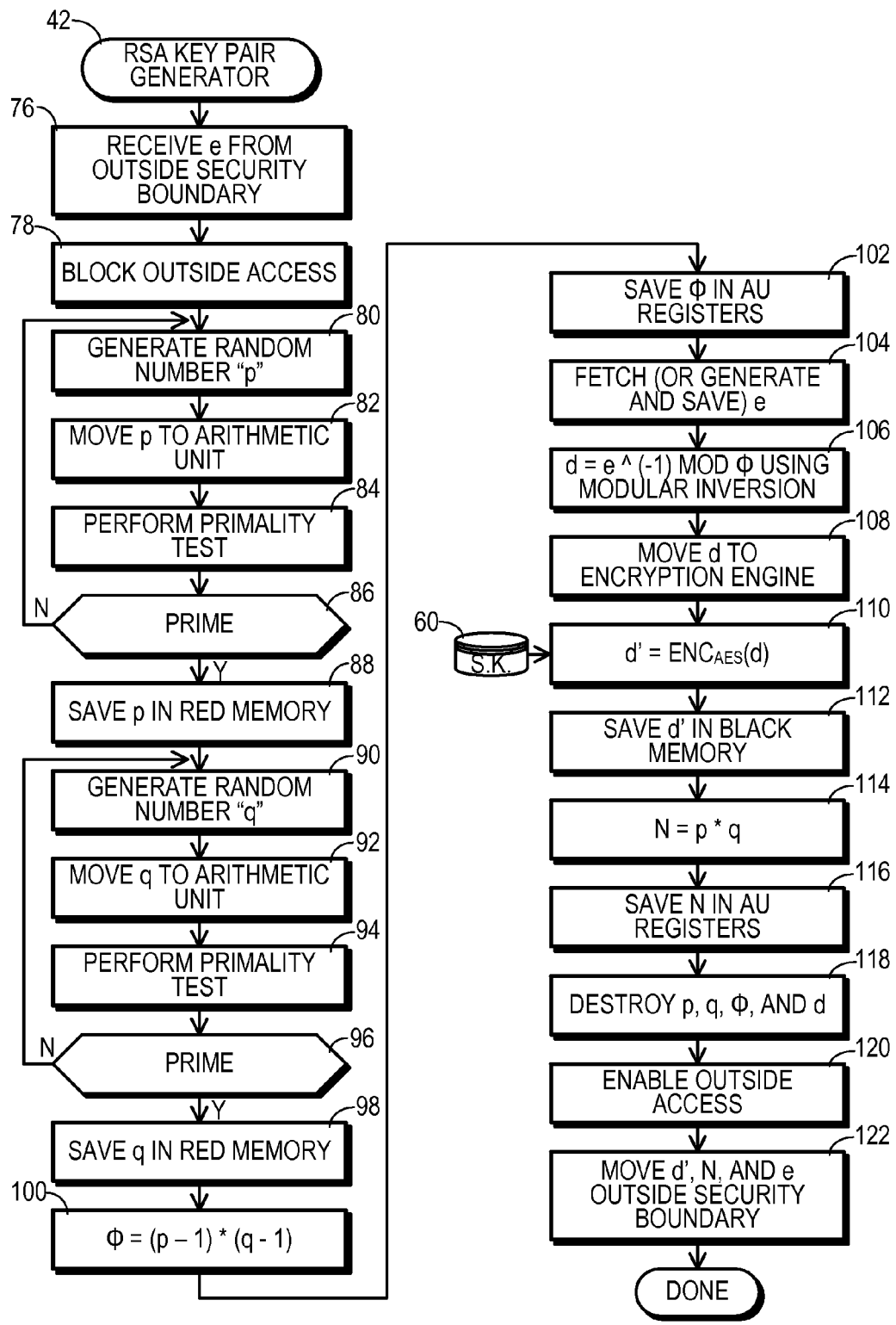
FIG. 6 shows a flow chart of a process followed by the asymmetric cryptographic integrated circuit to perform a representative cryptographic function, and in particular to generate a key pair for use in connection with RSA cryptography.

FIG. 6 shows a flow chart of an example process followed by asymmetric cryptographic IC 20 to perform a representative asymmetric cryptographic function, and in particular to generate a key pair for use in connection with RSA cryptography. Referring to FIG. 3 as well as to FIG. 6, asymmetric cryptographic IC 20 performs this process by executing RSA key-pair generator 42 defined by microcode 38 stored in ROM 40. Those skilled in the art will appreciate that this single asymmetric cryptographic function is but one of many different asymmetric cryptographic functions known to those skilled in the art that may be securely performed by an asymmetric cryptographic IC 20 as described herein. Moreover, those skilled in the art will appreciate that asymmetric cryptographic IC 20 is not limited to use in connection with RSA asymmetric cryptography but may be applied to other schemes of asymmetric cryptography, including but not limited to Diffie-Hellman, Elliptic Curve, and others.

RSA key-pair generator process 42 performs a task 76 to receive any data that may be necessary or useful to the performance of a cryptographic function from outside security boundary 44 and asymmetric cryptographic IC 20. While not necessary, it is often useful to receive a small encryption exponent parameter "e" from the untrustworthy environment. Typical values are e=3, or e=216+1 (i.e., 65537). Thus, small encryption exponent parameter e may be received from outside security boundary 44 during task 76. Of course, nothing requires any explicit activity on the part of asymmetric cryptographic IC 20 to carry out task 76. Task 76 may be carried out by having encryption exponent parameter e placed in black memory 46 prior to invoking process 42.

Following task 76, a task 78 causes asymmetric cryptographic IC 20 to block outside access to data within security boundary 44. In other words, the gateway in security boundary 44 provided by controller 36 is locked. No explicit activity needs to occur in order for task 78 to be performed. In one embodiment, task 78 may be performed merely by having controller 36 perform other tasks which do not cause data to appear at data port 22. In another embodiment, black memory 46 may be configured to have an external interface outside security boundary 44, and outside access to the interior of security boundary 44 may be blocked by the structure of black memory 46. Regardless, following task 78 the data being generated within security boundary 44, including random prime numbers and a private key, are blocked from appearing at data port 22.

Next, a task 80 causes random number generator 50 to generate a random number and a task 82 moves that random number to arithmetic unit 62. This random number is referred to as prime "p", although its primality has not yet been verified. Prime p is desirably from several hundred to a few thousand bits in length. As discussed above, prime p is blocked from being detected from outside security boundary 44 and asymmetric cryptographic IC 20 by physical barriers, lack of electronic interconnection, and ROM-based microcode configuration.

In a task 84, arithmetic unit 62 becomes primality tester 72 by executing the appropriate section of microcode 38" to verify the primality of prime p. An evaluation of the primality is indicated in a query task 86, and until primality is verified, program control loops back to task 80. The generation of subsequent random numbers is repeated in task 80 until a random number which can be verified as being prime is obtained. Those skilled in the art will appreciate that the rapid generation of random numbers is desirable since random numbers may need to be repeatedly generated in the search for a prime. In addition to the security enhancements achieved by placing random number generator 50 inside security boundary 44, the rapid generation of random numbers is promoted by the hardware implementation of random number generator 50 and by its hardware entropy source 54.

When the primality of prime p has been verified, a task 88 saves prime p in red memory 48. Then, tasks 90, 92, 94, 96, and 98 respectively repeat tasks 80, 82, 84, 86, and 88, for a second random prime number "q". Thus, when task 98 eventually saves a verified prime q in red memory 48, two random prime number have been generated. For improved strength, each of random primes p and q are of approximately the same bit length, which is about ½ of the bit length of a yet-to-be produced private key, and each has a generous number of bits.

Next, a task 100 computes the parameter "Φ", using arithmetic unit 62 as the integer product of p−1 and q−1. Certain optimizations may also be included in task 100, such as finding the least common multiple (LCM) of p−1 and q−1 or right-shifting (i.e., dividing by 2) p−1 and q−1 to remove zeros in the right of p−1 and q−1. Such optimizations can reduce subsequent processing cycles. Parameter Φ, whether or not optimized to or toward the LCM of p−1 and q−1, is saved in arithmetic unit (AU) registers 64 in a task 102.

Next a task 104 fetches the small encryption exponent parameter e previously received from outside security boundary 44 in task 76 into arithmetic unit 62. But in an alternate embodiment, e need not be received from the untrustworthy environment but task 104 may cause e to be generated internally using random number generator 50.

Following task 104, a task 106 performs the calculation that produces a private key "d", referred herein as a clear private key. Task 106 uses modular inversion and modular exponentiation operations carried out in arithmetic unit 62 on the small encryption exponent parameter e and on parameter Φ.

Next, a task 108 moves clear private key d to encryption engine 56, and a symmetric key encryption process (e.g., advanced encryption standard, AES) is carried out on clear private key d in a task 110. As discussed above, the symmetric key encryption process of task 110 is performed using symmetric key (S.K.) 60. The result of task 110 is an encrypted private key d', which a task 112 saves in black memory 46.

Clear private key d need not exist in any location other than arithmetic unit 62 and encryption engine 56, both of which reside inside security boundary 44. Thus, clear private key d is blocked from being detected from outside security boundary 44 and asymmetric cryptographic IC 20 by physical barriers, lack of electronic interconnection, and ROM-based microcode configuration. On the other hand, encrypted private key d' may be, and desirably is, disclosed outside security boundary 44 and asymmetric cryptographic IC 20. Unlike clear private key d, encrypted private key d' is not cryptographically sensitive because it has been encrypted. Security is maintained because encrypted private key d' is encrypted using symmetric key 60. As discussed above, symmetric key 60 is configured as a random number having a generous number of bits, and symmetric key 60 is retained within the confines of security boundary 44.

Next, a task 114 generates a public key "N" as an integer product of random primes p and q, and a task 116 saves public key N in registers 64 of arithmetic unit 62. The public key may also be considered to be the set of N and e. Regardless, the public key is mathematically related to clear private key d. The RSA asymmetric cryptographic scheme is based upon the complexity of a factorization problem when a number, such as public key N, has only large prime factors, such as p and q. In order to maintain a strong level of security, p and q are each strong random prime numbers, and each has a generous number of bits. Thus, a strong level of security is maintained within asymmetric cryptographic IC 20 by placing both random number generator 50 and primality tester 72 within security boundary 44, making them unresponsive to data generated outside security boundary 44, and implementing the entirety of security boundary 44 within the confines of a single integrated circuit 20.

Following task 116, a task 118 destroys the sensitive cryptographic data present within security boundary 44. In particular, primes p and q, clear private key d, and parameter Φ are all desirably destroyed. The destruction of data in task 118 may be accomplished by writing other data (such as zeros) in the registers and/or memory locations where such data are and have been stored. At this point in process 42, no sensitive data, other than symmetric key 60, remains within security boundary 44.

Next, a task 120 complements task 76 discussed above and enables outside access to data generated by asymmetric cryptographic IC 20. In particular, as indicated in a task 122, encrypted private key d', and public key [N, e] are moved outside security boundary 44. These data are moved through data port 22 and one or more of pins 28. As with task 76 discussed above, task 120 may be performed either explicitly or implicitly.

After moving encrypted private key d' outside security boundary 44 and after being de-energized, asymmetric cryptographic IC 20 would have no way of recreating clear private key d to perform future cryptographic functions, such as decrypting data encrypted in the untrustworthy environment using public key [N, e], or encrypting data using clear private key d for decryption using public key [N, e]. Accordingly, encrypted private key d' is desirably stored in non-volatile storage in untrustworthy storage section 12 so that it may be passed back to asymmetric cryptographic IC 20 when needed.

Following task 122 RSA key-pair generator process 42 is finished. As discussed above, asymmetric cryptographic IC 20 may then be used as needed to perform any of a wide variety of cryptographic operations, including asymmetric cryptographic encryption and decryption operations. And, since the cryptographically sensitive data generated in asymmetric cryptographic IC 20 are all destroyed at the close of an operation, such as process 42, asymmetric cryptographic IC 20 may lend its functions to untrustworthy software executed in data processing system 10 as well.

Figure 7:
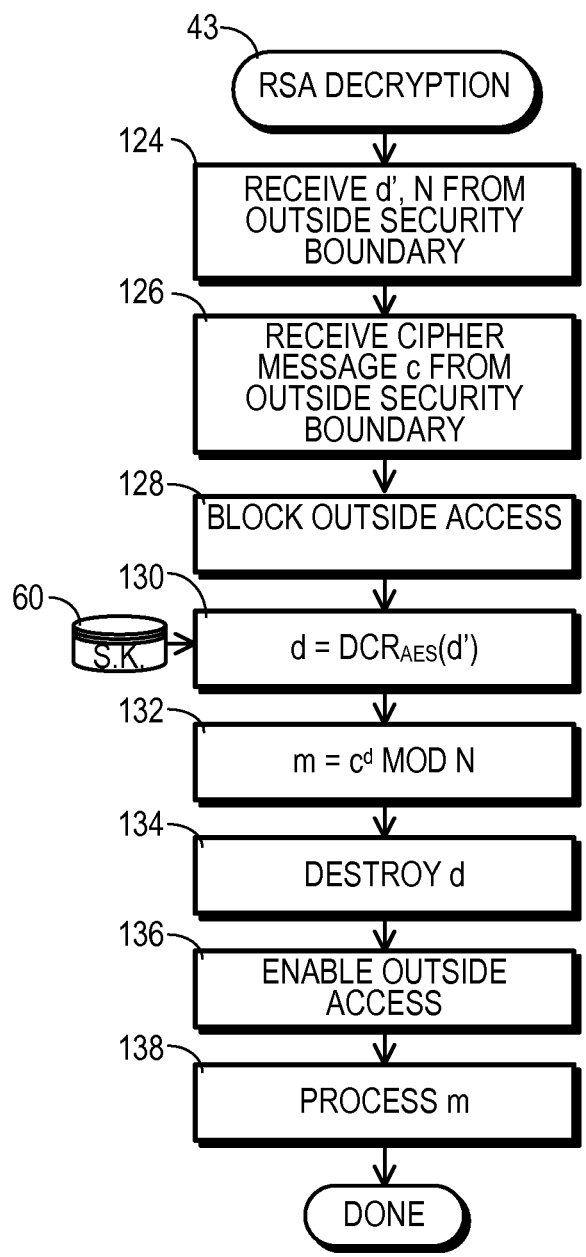
FIG. 7 shows a flow chart of a process followed by the asymmetric cryptographic integrated circuit to perform a representative cryptographic function, and in particular to decrypt a cipher message encrypted using a public key generated by the asymmetric cryptographic integrated circuit.

FIG. 7 shows a flow chart of a process followed by asymmetric cryptographic IC 20 to perform another representative asymmetric cryptographic operation, and in particular to decrypt a cipher message "c" encrypted using public key [N, e] generated as discussed above in connection with process 42 (FIG. 6). Presumably, prior to performing this process device 10 passed public key [N, e] to a remote device that has used public key [N, e] to produce cipher message c, and sent cipher message c to device 10. Referring to FIGS. 3 and 7, asymmetric cryptographic IC 20 performs RSA decryption process 43 by executing a portion of microcode 38 stored in ROM 40. Those skilled in the art will again appreciate that this single asymmetric cryptographic operation is but one of many different asymmetric cryptographic operations known to those skilled in the art that may be securely performed by an asymmetric cryptographic IC 20 as described herein, and that asymmetric cryptographic IC 20 is not limited to use only in connection with RSA asymmetric cryptography.

RSA decryption process 43 includes a task 124 and a task 126 to obtain data from outside security boundary 44. FIG. 7 indicates that the public key N and encrypted private key d' are obtained in task 124 and that cipher message c is obtained in task 126. Encrypted private key d' may be obtained from a nonvolatile storage area of untrustworthy storage section 12 (FIG. 1). As discussed above, because encrypted private key d' is encrypted, it is secure even though it is obtained from outside security boundary 44.

Following tasks 124 and 126, a task 128 causes asymmetric cryptographic IC 20 to block outside access to data within security boundary 44. Following task 128, sensitive cryptographic data will be generated within security boundary 44, but components and circuits outside security boundary 44 will not be able to view it. As discussed above in connection with tasks 76 and 78 (FIG. 6), tasks 124, 126, and 128 may be performed either explicitly or implicitly.

Next, a task 130 regenerates clear private key d from encrypted private key d' using symmetric key encryption engine 56 and symmetric key (S.K.) 60. Task 130 performs a complimentary process to that discussed above in connection with task 110 (FIG. 6). In one embodiment, symmetric key encryption engine 56 uses the AES encryption standard to perform this decryption operation, but this particular type of decryption is not required. Rather, the operation performed in task 130 is complimentary to whatever type of encryption was performed in task 110, uses the same symmetric key, and takes place within the same security boundary 44 within the same asymmetric cryptographic IC 20. After decryption, regenerated clear private key d may be stored in a register 64 (FIG. 5) of arithmetic unit 62.

Following task 130, a task 132 decrypts cipher message c within arithmetic unit 62 by performing a modular exponentiation operation using clear private key d and public key N. This operation is known to those skilled in the art of asymmetric cryptography. Task 132 generates clear message "m" from cipher message c.

Then, a task 134 destroys cryptographically sensitive information located within security boundary 44, such as clear private key d, as discussed above in connection with task 118 (FIG. 6). Next, a task 136 enables outside access to the interior of security boundary 44 so that data (e.g., clear message m) within security boundary 44 may be accessed from outside security boundary 44. And, a task 138 may process clear message m as required by higher level functions. For example, in one embodiment a section (not shown) of microcode 38 may be executed to determine if a high likelihood exists that clear message m is valid. Those skilled in the art will appreciate that the order of tasks 134, 136, and 138 in particular may be changed as needed to meet the particular requirements of a given application. Following task 138, RSA decryption process 43 is finished. As discussed above, asymmetric cryptographic IC 20 may then be used again as needed to perform any of a wide variety of cryptographic operations.

Those skilled in the art will appreciate that all security systems have certain vulnerabilities and that risks, consequences, and costs associated with the vulnerabilities are weighed in arriving at a suitable level of security for a particular application. A vulnerability of one embodiment of the present invention is associated with the use and storage of symmetric key 60 within security boundary 44. Should symmetric key 60 somehow be known outside security boundary 44 security would be compromised.

But this is a low risk, low consequence, security vulnerability in a preferably low cost data processing device 10. When symmetric key source 58 is implemented as electronic fuses buried deep down close to substrate 24, reverse engineering an asymmetric cryptographic IC 20 to discover the value of its symmetric key 60 would be exceedingly expensive and almost certainly unsuccessful. Moreover, should an attacker attempt such an attack, the user of the attacked data processing device 10 would become aware of the attack because the attacked data processing device 10 would be missing, or at least its cryptographic features would cease to function. Mitigating action may be undertaken. And, if the almost impossible attack were successful and an attacker able to discover a symmetric key 60 for a specific data processing device 10, the security breach would not propagate beyond the influence of the attacked data processing device 10. The discovery of a symmetric key 60 for a single data processing device 10 would have no impact on security for other data processing devices 10 in a population of devices 10.

An asymmetric cryptographic device with local private key generation and method are provided by at least one embodiment of the present invention. At least one embodiment of the present invention implements a primality tester and random number generator within a common integrated circuit. At least one embodiment of the present invention establishes a security boundary that resides entirely within the confines of a single integrated circuit. At least one embodiment of the present invention blocks a clear private key and random prime numbers used in constructing the clear private key from being detected from outside the integrated circuit where they are generated. At least one embodiment of the present invention provides a low cost, serious, strong level of security for a data processing device operated in an untrustworthy environment through the use of a low cost integrated circuit.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A data processing device which provides asymmetric cryptographic functions, said device comprising:
   an untrustworthy storage section configured for read and write operations;
   an untrustworthy input/output section coupled to said processor section and configured to obtain data from outside said device and to provide data outside said device; and
   an asymmetric-key, cryptographic integrated circuit coupled to said storage section and said input/output section, said integrated circuit imposing a security boundary that is entirely contained within said integrated circuit and untrustworthy circuits including a processor section located within said integrated circuit and outside said security boundary, said processor section being configured to execute computer software instructions obtained from outside said security boundary, and said integrated circuit being configured in response to microcode confined inside said security boundary to generate random prime numbers and a clear private key within said security boundary, and said integrated circuit being configured in response to said microcode to prevent said random prime numbers and said clear private key from being detected from outside said security boundary, wherein said integrated circuit comprises:
   a integrated circuit package;
   a semiconductor substrate embedded within said package;
   a random number generator formed on said substrate inside said security boundary and embedded within said package;
   a primality tester formed on said substrate inside said security boundary and embedded within said package;
   a non-volatile source of a symmetric key, said symmetric-key source being located within said security boundary;
   an encryption engine located within said security boundary, coupled to said symmetric-key source and configured to encrypt said clear private key using said symmetric key to produce an encrypted private key; and
   a controller formed on said substrate and embedded within said package, said controller being coupled to said random number generator, to said primality tester, and to said processor section, and said controller serving as a gateway through said security boundary;
   wherein said controller is configured in response to said microcode to send data outside said security boundary to said processor section, to receive data from said processor section, to manage said random number generator and said primality tester to generate said clear private key, to block said clear private key from being detected from outside said security boundary, and to send said encrypted private key outside said security boundary for storage.

* * * * *